No. 758,313. PATENTED APR. 26, 1904.
F. W. HALL.
MOLDING MACHINE.
APPLICATION FILED AUG. 10, 1903.
NO MODEL. 3 SHEETS—SHEET 3.
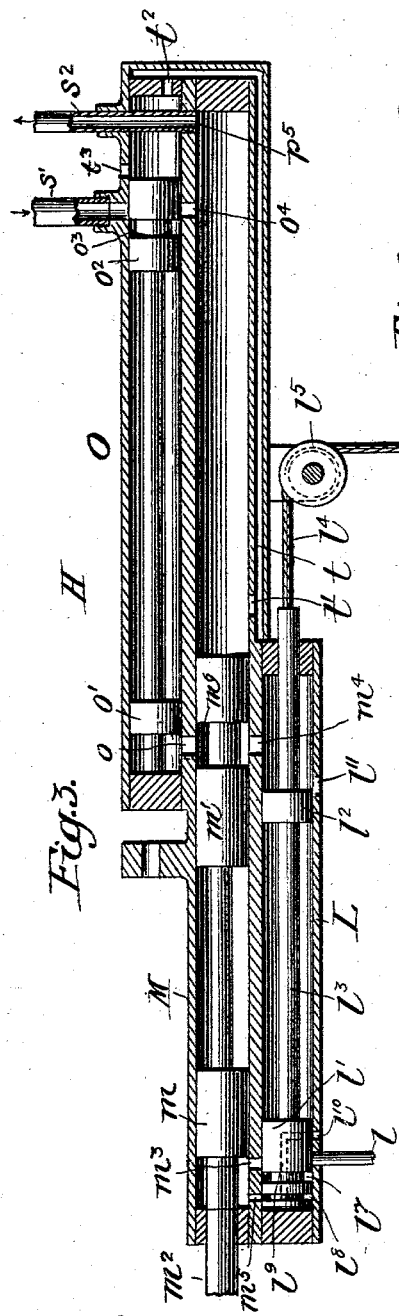
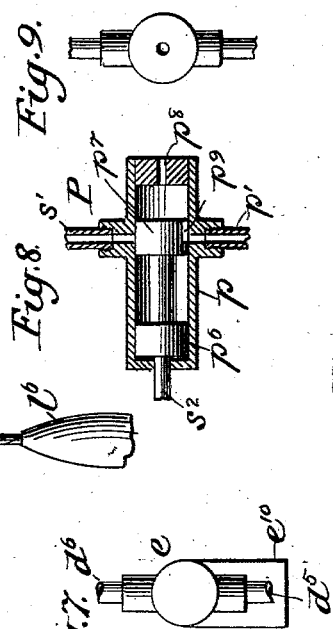
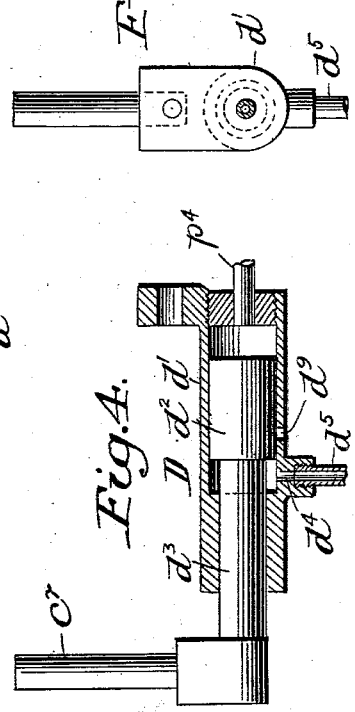
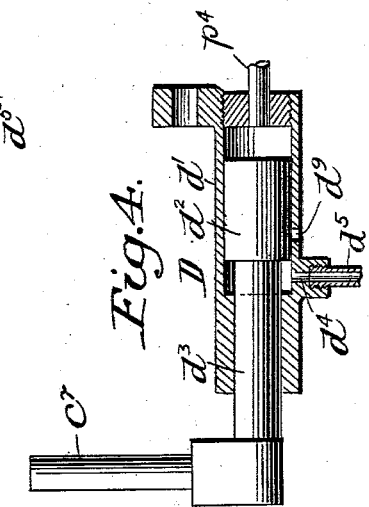
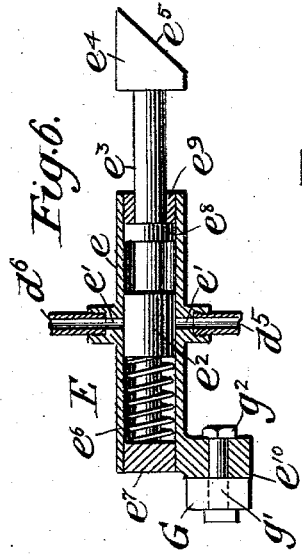
Witnesses:
D. W. Edelin.
Austin Harveycutter
Inventor:
Frederick W. Hall.
by H. V. Heaton, Atty.

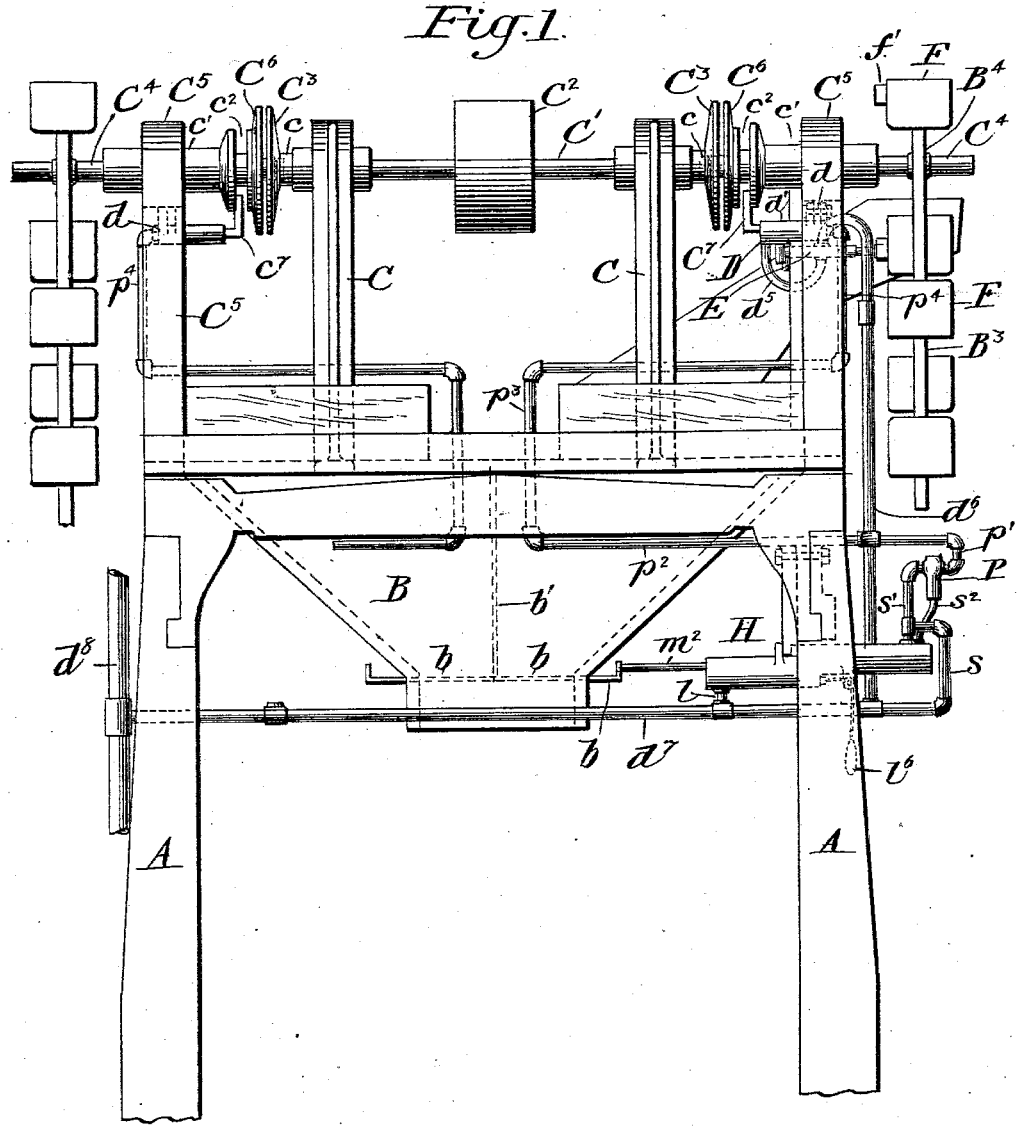

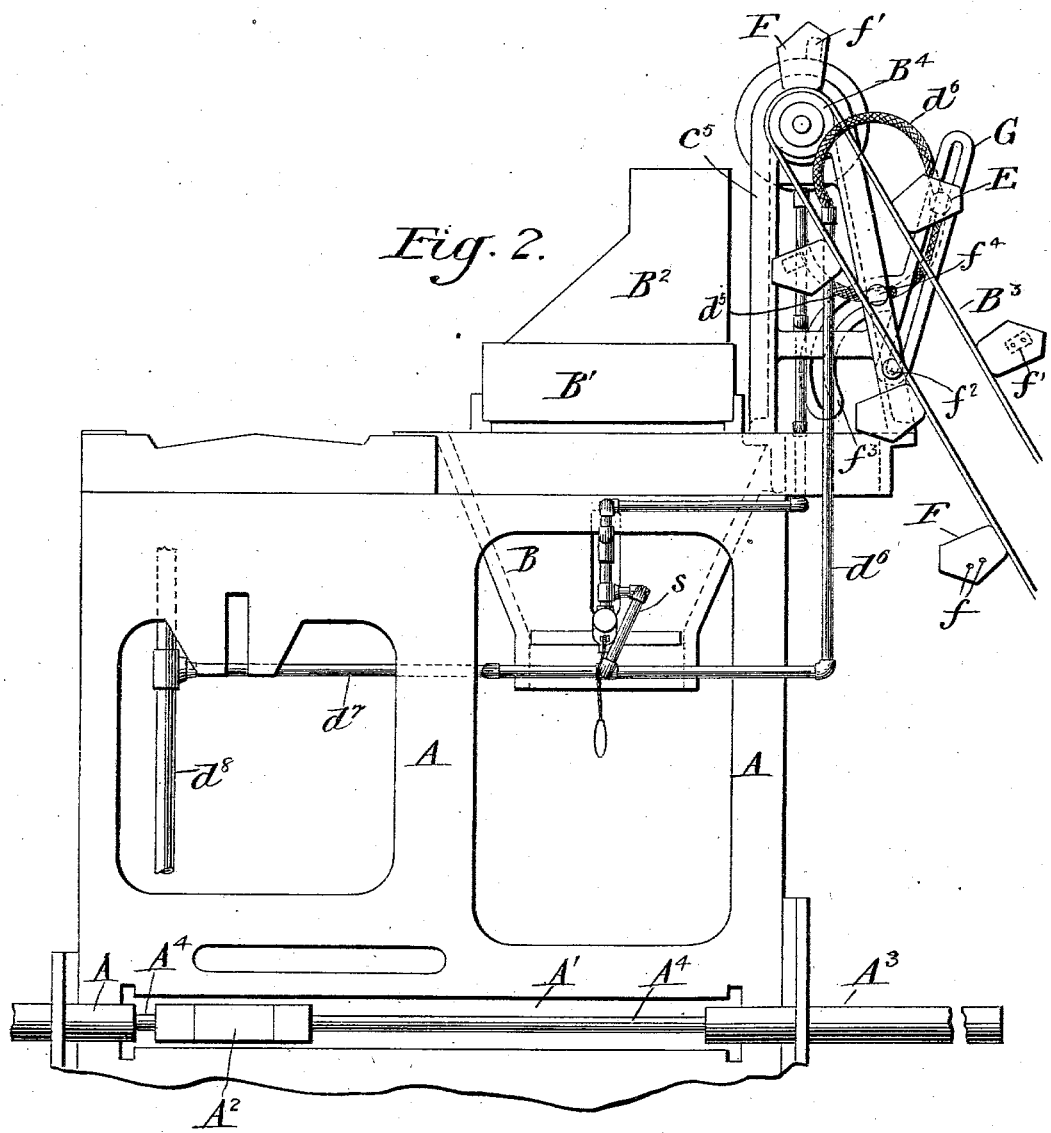

No. 758,313.

Patented April 26, 1904.

UNITED STATES PATENT OFFICE.

FREDERICK W. HALL, OF CAMDEN, NEW JERSEY, ASSIGNOR OF ONE-HALF TO J. W. PAXSON COMPANY, OF PHILADELPHIA, PENNSYLVANIA, A CORPORATION OF PENNSYLVANIA.

MOLDING-MACHINE.

SPECIFICATION forming part of Letters Patent No. 758,313, dated April 26, 1904.

Application filed August 10, 1903. Serial No. 168,932. (No model.)

*To all whom it may concern:*

Be it known that I, FREDERICK W. HALL, a citizen of the United States, residing at Camden, in the State of New Jersey, have invented certain new and useful Improvements in Molding-Machines, of which the following is a full, clear, and exact description, reference being had to the accompanying drawings, forming a part of this specification.

The invention to be hereinafter described relates to molding-machines, and more particularly to the means for supplying the flask with the sand or other molding material that is to be rammed around the patterns. In devices of this general character, especially where a series of molds of substantially the same kind are to be formed or where a series of molds bearing a determined quantitive relation as to the amount of sand or other molding material are be produced, it is desirable that the proper determined quantity of sand or molding material to be supplied to the flask without the constant vigilance of the operative, whose time can be utilized in attention to the other parts of the machine.

The object of the present invention is to provide a molding-machine with means whereby any determined quantity of sand or other molding material may be supplied to a suitable receptacle and when the amount placed therein has become sufficient for the mold next to be formed the device will automatically act to shut off the supply.

The invention has for its further object to provide means whereby upon the discharge of the material from said receptacle the supplying means will be automatically set in operation to again place in the receptacle another charge, thus simplifying the duties of the operative and rendering less skill necessary on his part in manipulating the machine.

With these generally-stated objects in view the invention consists of the parts and combinations to be hereinafter described and then definitely pointed out in the claims.

In the drawings, Figure 1 is a front elevation of a machine embodying my invention, parts being broken away and others omitted for the purpose of clear illustration. Fig. 2 is a side elevation of a machine, showing my invention applied thereto, parts being omitted and others broken away for clearness. Fig. 3 is a sectional detail view of the dumping and starting valve device. Fig. 4 is a sectional detail of the clutch-valve and its connected parts. Fig. 5 is a front view of parts shown in Fig. 4. Fig. 6 is a sectional detail of the trip-valve. Fig. 7 is a front view of parts shown in Fig. 6. Fig. 8 is a detail sectional view of the auxiliary valve, and Fig. 9 is a front view of the same.

In the drawings, A represents the main supporting-frame upon which the working parts are mounted, the said frame being slotted at $A'$ for the sliding support of a table $A^2$, Fig. 2, movable from front to rear of the main supporting-frame by any suitable means, as the cylinders $A^3$ and the piston-actuated rods $A^4$, so that said table may be moved by power to either the position shown in Fig. 2, where the ramming operation may take place, or to the right in said Fig. 2 to enable the flask to be charged with sand or other material.

As the features so far referred to form no part of my present invention, further details of description and drawings will be unnecessary.

Suitably supported on the main frame A is the receptacle or hopper B, having discharging-slides $b\ b$ in its lower part, the said hopper B in the present embodiment of the invention being shown as formed with a central partition-wall $b'$, it being understood that the means for feeding and dumping the hopper B are duplicated on each side of the machine, as indicated in Fig. 1. Since the said means for feeding and dumping the hopper on each side of the machine are duplicates of each other, I have for clearness of illustration and description of the device shown said means on one side thereof and have indicated only so much of the duplicate means on the other side of the machine as would serve to make clear the general arrangement and duplication.

Disposed above the hopper B is a receptacle $B'$, which may be the ordinary sieve and which receives the sand or other molding material by means of a chute B² from a chain of buckets B³ in a manner as will more fully hereinafter appear.

Mounted in suitable bearings in the intermediate uprights C C is a driven shaft C', carrying a belt-pulley C², by which it is rotated from any usual or suitable source of power. At each end the shaft C' terminates in a clutch-disk C³ C³, the central portion of each of which is suitably recessed, as at $c$, Fig. 1, to receive and support one end of a bucket-shaft C⁴, the said bucket-shafts being also carried in suitable elongated journal-bearings $c'$ $c'$ on the exterior uprights C⁵ C⁵, projecting upward from the main frame A, as clearly seen in Figs. 1 and 2. Splined to the inner portions of each of the bucket-shafts C⁴ C⁴ is the movable clutch-disk C⁶ C⁶, having an annular groove $c^2$ $c^2$, engaged each by a clutch-shifter C⁷ C⁷, whereby while said clutch-disks C⁶ C⁶ are rotatable with the bucket-shafts C⁴ C⁴ they are also movable thereon longitudinally toward and from the clutch-disks C³ C³, carried by the driven shaft C', as will be obvious. The disks C³ C⁶ constitute the two members of a clutch whereby the motion of shaft C' may be transmitted to the bucket-shafts C⁴ C⁴ when said disks are in contact, or the bucket-shafts may remain at rest when the disks C³ C⁶ are disengaged.

While the clutch shown is of the general type of friction-clutches, it is to be understood that my invention is not limited in this respect and that other forms of clutches might be used.

Secured to each of the shafts C⁴ is a bucket-wheel B⁴, carrying a chain of buckets B³, which may be supplied with sand or other molding material from any suitable source, the buckets then delivering their contents to the chute B² as each bucket passes over the bucket wheel or pulley D, as will clearly appear from Fig. 2, the sand or other molding material then passing down the chute through the receptacle or sieve B' and into the charging-hopper B, the bottom slides $b$ being at such time in their closed position, as indicated in Fig. 1.

In order that the requisite quantity of sand or other molding material may be delivered to the hopper B irrespective of any attention on the part of the operative, I have devised a clutch-operating mechanism which when the desired quantity of material has been delivered to the hopper B automatically operates to separate the members of the clutch and stop the chain of buckets.

Secured to the uprights C⁵, as by the bolt $d$, Fig. 1, is the clutch-operating device, (designated as a whole by the reference-letter D and shown more clearly in detail in Figs. 4 and 5 of the drawings.) This device comprises a cylinder $d'$, in which works the shifter-piston $d^2$, having a projecting stem $d^3$, carrying at its outer end the clutch-shifter C⁷, which, as stated, engages in the slot $c^2$ of the disk C⁶, so that movement of the piston $d^2$ in the cylinder $d'$ will cause the clutch-shifter C⁷ to carry the disk C⁶ into or out of engagement with the disk C³ on the driven shaft C', according to the direction of movement of the piston. Near one end of the cylinder $d$, Fig. 4, is an inlet-port $d^4$, having connected thereto a pipe $d^5$, leading from suitable piping connection $d^6$, $d^7$, and $d^8$ in communication with a source of air or other fluid supply. From this and the illustration of Fig. 4 it will be evident that air or fluid pressure admitted to cylinder $d'$ through pipe $d^5$ and port $d^4$ will cause the piston $d^2$ to move to the right in Figs. 1 and 4, thus carrying the clutch-shifter C⁷ in a direction to separate the clutch members C³ and C⁶.

To control the admission of air or fluid pressure to the cylinder $d'$ through port $d^4$, there is interposed in the length of pipe $d^5$ a shifter-controlling valve. (Indicated in Figs. 1, 2, and 6 by reference-letter E.) This valve comprises a cylinder $e$, having opposite ports $e'$ $e'$, connected one to the admission-pipe $d^5$ and the other to the pipe $d^6$, a piston $e^2$ normally closing communication between the pipes $d^5$ and $d^6$, as shown in Fig. 6, so that with the parts in the position indicated in said figure no air or other fluid pressure can pass through the controlling-valve to operate the shifter-piston $d^2$.

Extending from the piston $e^2$ is a stem $e^3$, carrying a trip-head $e^4$, having a bevel side $e^5$, a spring $e^6$, interposed between the end $e^7$ of the cylinder and the piston $e^2$, serving to hold the parts in the position shown in Fig. 6, with the stop $e^8$ against the end $e^9$ of the cylinder. The cylinder $e$ is provided with a lug or attaching-ear $e^{10}$, by which it may be secured in position as desired for a purpose that will hereinafter appear, it being understood that part of the piping connections shown, as $d^5$ and $d^6$, may be flexible to permit the ready change of position of the controlling-valve with respect to the clutch-operating device.

Each of the buckets F of the chain of buckets is provided with means on the side thereof, such as the holes $f$ $f$, for the ready attachment of a trip-lug $f'$, which contacting with the trip-head $e^4$ of the controlling-valve E will cause the piston $e^2$ to be pushed backward past the ports $e'$ $e'$ against the force of the spring $e^6$, thereby putting the pipes $d^5$ and $d^6$ in communication and allowing fluid-pressure to pass to the cylinder $d'$, causing the clutch-shifter C⁷ to separate the clutch members C³ C⁶. It is evident that by a proper disposition of the trip-lugs $f'$ upon certain buckets of the chain of buckets any desired quantity of sand or like molding material may be supplied to the hopper B and when so supplied that the controlling-valve E will be automatically operated to stop the delivery of more material.

In a device of this general character it is desirable to adjust the position of the controlling-valve E with respect to the chain of buckets, so that said valve may be acted upon by a trip-lug on any bucket somewhat sooner or later than if always held in fixed position. For instance, it may be found that the momentum of parts will cause the buckets to continue to move for some time even after the controlling-valve has acted and the members of the clutch have been separated, and to meet these conditions I have mounted the controlling-valve E upon an adjustable support comprising the slotted arm G, Fig. 2, the lug $e^{10}$ of the controlling-valve being readily moved lengthwise of the arm G and clamped thereto by suitable means, such as the bolt and nut $g'$ $g^2$, Fig. 6. At its lower end the slotted arm G, Fig. 2, is pivotally connected to a part of the upright or standard $C^5$, as at $f^2$, and has a curved slotted side extension $f^3$, which by means of a suitable clamp-screw $f^4$, Fig. 2, supports the slotted arm G in any of the inclined positions to which it may have been adjusted, as will be obvious. From this it will be clear that the controlling-valve E may be so adjusted with relation to the chain of buckets that any overrunning of the chain due to momentum after the clutch members have been disengaged will not serve to vary the quantity of sand or other mold material delivered to the hopper B.

Referring to Fig. 4, it will be noted that the cylinder $d'$ is provided with an exhaust-port $d^9$, which as soon as the piston $d^2$ has moved sufficiently far to separate the clutch members $C^3$ $C^6$ permits the air or fluid pressure on the left of the piston to escape, the spring $e^6$ in the controlling-valve E acting immediately after the passage of the trip-lug past the trip-head $e^4$ to close communication between the pipes $d^5$ and $d^6$, thereby shutting off the fluid-pressure from the cylinder $d'$, so that the piston $d^2$ and the shifter carried thereby are now free to be moved in the opposite direction upon the application of a moving force.

The chain of buckets having delivered a sufficient quantity of sand or other molding material to the hopper B and said chain of buckets now standing idle, I have provided a valve device for dumping the hopper and have connected thereto means whereby the action of dumping will set into operation the chain of buckets to effect another supply of sand or other molding material.

Suitably connected to the supporting-frame A is the dumping and starting device, (designated as a whole by H, Fig. 1.) Referring more particularly to Fig. 3, the dumping and starting device comprises a series of three cylinders L, M, and O, the lower one, L, of which is connected near one end to the source of air or fluid supply by a pipe $l$, Figs. 1 and 3, and has freely movable therein the pistons $l'$ $l^2$, connected by the rod $l^3$, which is joined, by a flexible connection $l^4$ passing over a pulley or idler $l^5$, with a hand-pull $l^6$, whereby the pistons $l'$ and $l^2$ may be pulled to the right, Fig. 3. Disposed above the cylinder L is the longer cylinder M, having the pistons $m$ $m'$, movable therein and connected by a rod $m^2$ with the slide $b$ of the hopper B, from which it will be seen that movement of the pistons $m$ $m'$ to the right will open the bottom of the hopper and permit the contents to be dumped or discharged therefrom. To effect this movement of the pistons $m$ $m'$, an inlet-port $m^3$ is provided in the wall of cylinder M opposite the air or fluid supply pipe $l$, connected to cylinder L, and piston $l'$ is provided with a circular groove $l^7$, whereby upon piston $l'$ being moved to the right, Fig. 3, by means of the hand-pull $l^6$ air or other fluid will pass into cylinder M to the left of piston $m$, (shown in its normal position in Fig. 3,) and said piston will move to the right, withdrawing the slide $b$ and allowing the material in the hopper B to fall.

It is desirable at this time to set into operation the buckets for supplying the molding material and to simultaneously close the slide in the bottom of the hopper which has just been withdrawn, and these results are secured by substantially the following: Connected to the cylinder M by the port $o$ is the cylinder O, in which operate the pistons $o'$ $o^2$, the piston $o^2$ having a groove or passage-way $o^3$, which under the action of air or other fluid-pressure admitted to the left of piston $o'$ as piston M moves past the port $o$ to the right is brought into communication with pipe $s$, connected to pipe $s'$, leading to the source of air or fluid pressure supply by means of pipes $d^7$ and $d^8$, and by means of port $o^4$ near the end of cylinder M the live air or fluid pressure is admitted to the right of piston $m'$. At this time also the live air or fluid pressure to the left of piston $m$ passes through the port $m^4$ and acting on the right of piston $l^2$ forces pistons $l^2$ and $l'$ to the left, and the piston $l'$ being formed with an exhaust-groove $l^8$, then in communication with exhaust-port $m^5$ of cylinder M, permits the air or fluid pressure on the left of piston $m$ to exhaust through port $m^5$, groove $l^8$, longitudinal channel-way $l^9$, and exhaust-port $l^{10}$ in the wall of cylinder L. The air or fluid admitted to the right of piston $m'$ through piston $o^2$ and pipe $s'$ then acts to force piston $m$ and the slide $b$ to the left, when they will assume the position shown in Figs. 1 and 3, with the bottom of the hopper closed. Connected to the end of cylinder M and shown as passing through the cylinder O is the pipe $s^2$, leading to the auxiliary valve P, which, as shown more clearly in Figs. 8 and 9, comprises a cylinder $p$, connected to the pipe $s'$, leading to the source of air or fluid supply through pipes $s$, $d^7$, and $d^8$, and directly opposite the connection with pipe $s'$ is the pipe connection $p'$, leading through pipes $p^2$, $p^3$, and $p^4$ to the end of the cylinder $d'$ of the clutch-operating device D, from which it will be evident that air or fluid pressure passing the auxiliary valve P will find its way to the right of piston $d^2$, Fig. 4, and cause the same to be moved to the left to thereby bring the members $C^3$ $C^6$ of the clutch into operative engagement and start the chain of buckets. As live air or fluid pressure was admitted to the right of piston $m'$ through the groove $o^3$ in piston $o^2$, as before explained, it caused the pistons $m$ and $m'$ to move to the left, and part of that air or other fluid pressure will pass in the direction of the arrow $p^5$, Fig. 3, into pipe $s^2$, leading to the auxiliary valve P below the piston $p^6$ of said valve, thereby lifting the pistons $p^6$ and $p^7$ and permitting the air or fluid pressure to pass from pipe $s'$ to pipe $p'$ and thence to the end of cylinder $d'$ to operate the clutch. Referring to Fig. 8, it will be noted that the auxiliary valve P has an exhaust-port $p^8$ and that piston $p^7$ has a groove $p^9$, which puts the pipe $p'$, leading to the right of cylinder $d'$, in communication with the exhaust-port $p^8$ after the pistons $p^6$ and $p^7$ have returned to their normal positions, as shown in Fig. 8, thus taking the pressure off of the right end of piston $d^2$, so that upon the buckets operating upon the trip-heads of the shifter-controlling device the clutch members may be disengaged, as hereinbefore stated. In order that the pistons $o'$ and $o^2$ may be returned to their normal position, as shown in Fig. 3, after they have been moved to the right by air or fluid pressure passing into cylinder O through port $o$, I provide a passageway $t$, connecting ports $t'$ $t^2$, whereby as piston $m'$ during its movement to the left uncovers port $t'$ air or fluid pressure will pass to the right of piston $o^2$, the pressure to the left of piston $o'$ being at that moment exhausted through port $o$, around groove $m^6$ in piston $m'$, through port $m^4$, and thence to the atmosphere through port $l^{11}$, as will be clear from Fig. 3, an exhaust-port $t^3$ being provided in cylinder O, which is uncovered by piston $o^2$ as said piston is moved to the left, thus relieving the pressure on the right of piston $o^2$, so that it may be free to move again to the right.

It will thus be seen that I provide a dumping and starting device which requires little attention on the part of the operative, it requiring simply a pull on the hand-pull $l^6$, whereupon the hopper-slide is automatically operated to permit the contents of the hopper to be discharged and is then moved back to its closing position, such movement of the parts serving also to effect the automatic starting of the chain of buckets to deliver to the hopper another supply of molding material.

Having thus described my invention, what I claim, and desire to secure by Letters Patent, is—

1. In a molding-machine, the combination of a hopper or receptacle, a conveyer for delivering molding material thereto, means for operating said conveyer, fluid-operated devices for rendering said means inoperative when a desired quantity of molding material has been delivered to the hopper or receptacle and means carried by the conveyer for controlling said fluid-operated devices.

2. In a molding-machine, the combination of a hopper or receptacle for receiving molding material, a conveyer for delivering molding material to said hopper or receptacle, means for operating said conveyer, fluid-operated devices for rendering said means inoperative when the desired quantity of molding material has been delivered to the hopper or receptacle, means carried by the conveyer for controlling the admission of fluid to said devices and a dumping and starting device for discharging the contents of the hopper or receptacle and rendering said first-mentioned means again operative.

3. In a molding-machine, the combination of a hopper or receptacle for receiving molding material, a conveyer for delivering molding material to said hopper or receptacle, means for operating said conveyer, said means including a clutch, and devices controlled by the conveyer for separating the members of the clutch and rendering said means inoperative when the desired quantity of material has been delivered to the hopper or receptacle.

4. In a molding-machine, the combination of a hopper or receptacle for receiving molding material, a conveyer for delivering molding material to said hopper or receptacle, means for operating said conveyer, said means including a clutch, and devices controlled by the conveyer for separating the members of the clutch and rendering said means inoperative when the desired quantity of material has been delivered to the hopper or receptacle, and a dumping and starting device for discharging the contents of the hopper and for simultaneously therewith engaging the members of the clutch and rendering said means operative.

5. In a molding-machine, the combination with a hopper or receptacle for receiving molding material, a conveyer for delivering material thereto, means for operating said conveyer, devices for rendering said means operative or inoperative, tripping means carried by the conveyer for acting upon said devices to thereby render said means inoperative when a desired quantity of material has been placed in the hopper, and a dumping and starting device for discharging the contents of the hopper and simultaneously therewith acting upon said first-named devices for again putting said means into operation.

6. In a molding-machine, the combination of a hopper or receptacle for receiving molding material, a conveyer for delivering molding material thereto, means for operating said conveyer, a shifter-controlling device for rendering said means inoperative when the desired quantity of material has been delivered to the hopper or receptacle, and a trip-lug carried by the conveyer for acting upon the shifter-controlling device.

7. In a molding-machine, the combination of a hopper or receptacle for holding molding material, a conveyer for delivering material thereto, means for operating said conveyer, said means including a clutch, a clutch-shifter, a shifter-controlling device adjustably mounted with respect to the conveyer, and devices carried by the conveyer to act upon the shifter-controlling device and render said means inoperative when the desired quantity of molding material has been delivered to the hopper.

8. In a molding device, the combination of a hopper or receptacle for holding molding material, a conveyer for delivering material thereto, means for operating said conveyer, said means including a clutch, a clutch-shifter for determining the engagement or disengagement of the clutch members, a shifter-controlling device having a trip-head, a trip-lug carried by the conveyer for engagement with the trip-head for actuating the shifter-controlling device and disengaging the clutch members when the desired quantity of material has been delivered to the hopper or receptacle.

9. In a molding-machine, the combination of a hopper or receptacle for holding molding material, a conveyer for delivering material thereto, means for operating said conveyer including a clutch, a fluid-operated clutch-shifter for operating the clutch, a shifter-controlling valve and means carried by the conveyer for acting upon the shifter-controlling valve to admit pressure to the clutch-shifter and thereby operate the clutch when the desired quantity of material has been delivered to the hopper or receptacle.

10. In a molding-machine, the combination of a hopper or receptacle for holding molding material, a conveyer for delivering material thereto, means for operating the conveyer, a controlling device for stopping the operation of said means when the desired quantity of material has been delivered to the hopper or receptacle, means for permitting adjustment of the position of the controlling device with respect to the conveyer to determine the time of action of said controlling device, and devices carried by the conveyer for operating the controlling device.

11. In a molding-machine, the combination of a hopper for receiving molding material, a conveyer for delivering material thereto, means for operating said conveyer, devices for determining the action or inaction of said operating means, trip devices carried by the conveyer for acting upon said first-named devices to render said means inoperative, a slide for said hopper, and a fluid-operated dumping and starting device for operating the said slide and simultaneously therewith causing the said first-named devices to set in operation said means.

12. In a molding-machine, the combination of a hopper or receptacle for receiving molding material, a conveyer for delivering material thereto, means for automatically stopping the conveyer when the desired quantity of molding material has been delivered to the hopper or receptacle, a slide for dumping or discharging the contents of the hopper, and devices operative upon movement of the slide to set the conveyer in operation.

13. In a molding-machine, the combination of a hopper or receptacle for receiving molding material, a conveyer for delivering material thereto, means for automatically stopping the conveyer when the desired quantity of molding material has been delivered to the hopper or receptacle, a dumping and starting device comprising means for discharging the contents of the hopper, and fluid-controlled devices operative upon the dumping or discharge of the hopper to set the conveyer again in operation.

14. In a molding-machine, the combination of a hopper or receptacle for receiving molding material, a conveyer for delivering material thereto, means for automatically stopping the conveyer when the desired quantity of molding material has been delivered to the hopper or receptacle, a slide for dumping or discharging the contents of the hopper, a piston connected to said slide, a cylinder containing said piston, suitable inlet and exhaust ports in said cylinder, devices for controlling the admission and exhaust of air or other fluid to and from said cylinder, and means controlled by the said piston for setting the conveyer into operation.

15. In a molding-machine, the combination of a conveyer for supplying molding material, fluid-actuated means for stopping and starting the conveyer, a hopper to receive the material from the conveyer, a fluid-actuated dumping and starting device for dumping and discharging the material from the hopper, and an auxiliary valve controlled by the dumping and starting device for setting in operation the fluid-actuated means for starting the conveyer.

In testimony whereof I have hereunto affixed my signature this 7th day of August, A. D. 1903.

FREDERICK W. HALL.

Witnesses:
A. FLORENCE YERGER,
AUSTIN HARVEYCUTTER.